(12) United States Patent
Nordmark et al.

(10) Patent No.: US 8,180,352 B2
(45) Date of Patent: May 15, 2012

(54) TOPOLOGY CONTROLLED DISCOVERY FOR NEXT HOP DETERMINATION

(75) Inventors: Erik Nordmark, Mountain View, CA (US); Samita Chakrabarti, Sunnyvale, CA (US)

(73) Assignee: Oracle America, Inc., Redwood City, CA (US)

(*) Notice: Subject to any disclaimer, the term of this patent is extended or adjusted under 35 U.S.C. 154(b) by 1099 days.

(21) Appl. No.: 12/047,097

(22) Filed: Mar. 12, 2008

(65) Prior Publication Data

US 2009/0046601 A1 Feb. 19, 2009

Related U.S. Application Data

(60) Provisional application No. 60/956,077, filed on Aug. 15, 2007.

(51) Int. Cl.
*H04W 72/00* (2009.01)

(52) U.S. Cl. ........ 455/445; 455/522; 455/421; 370/338; 370/349

(58) Field of Classification Search .............. 455/424, 455/425, 456.5, 456.6, 561, 550.1, 575.1, 455/522, 455, 69, 70, 63.1, 127.1, 513, 456.1; 370/318, 312, 313, 315, 310, 503, 338, 349, 370/400, 401, 390, 432
See application file for complete search history.

(56) References Cited

U.S. PATENT DOCUMENTS

| 5,031,093 | A | * | 7/1991 | Hasegawa | 709/241 |
|---|---|---|---|---|---|
| 5,926,101 | A | * | 7/1999 | Dasgupta | 370/408 |
| 6,542,494 | B1 | * | 4/2003 | Sugaya et al. | 370/345 |
| 6,735,448 | B1 | * | 5/2004 | Krishnamurthy et al. | 455/522 |
| 6,845,091 | B2 | * | 1/2005 | Ogier et al. | 370/338 |
| 6,898,433 | B1 | * | 5/2005 | Rajaniemi et al. | 455/456.1 |
| 7,155,237 | B2 | * | 12/2006 | Porcino | 455/456.1 |
| 7,231,216 | B2 | * | 6/2007 | Tafazolli et al. | 455/456.1 |
| 7,254,401 | B2 | * | 8/2007 | Keranen et al. | 455/456.1 |
| 7,349,441 | B2 | * | 3/2008 | Belcea | 370/503 |
| 7,769,888 | B2 | * | 8/2010 | Flammer et al. | 709/238 |
| 7,835,384 | B2 | * | 11/2010 | Furuskar et al. | 370/445 |
| 2001/0053699 | A1 | * | 12/2001 | McCrady et al. | 455/513 |
| 2002/0013856 | A1 | * | 1/2002 | Garcia-Luna-Aceves et al. | 709/238 |
| 2002/0086682 | A1 | * | 7/2002 | Naghian | 455/456 |
| 2004/0233918 | A1 | * | 11/2004 | Larsson et al. | 370/400 |
| 2007/0133483 | A1 | * | 6/2007 | Lee et al. | 370/338 |
| 2010/0039969 | A1 | * | 2/2010 | Sukenari et al. | 370/310 |

* cited by examiner

*Primary Examiner* — Duc Nguyen
*Assistant Examiner* — Charles Chow
(74) *Attorney, Agent, or Firm* — Osha • Liang LLP

(57) ABSTRACT

In a particular embodiment of the present invention, a particular node in an ad hoc network is configured with a desirable number of neighbor nodes and equipped with a transmission power level hierarchy. The particular node may adjust a transmission power level to a different level in the transmission power level hierarchy, based on a number of responses received from neighbor nodes after the particular node broadcasts a request at current transmission power level. This adjustment process is repeated until the particular node acquires a desirable number of neighbor nodes.

16 Claims, 3 Drawing Sheets

TOPOLOGY CONTROLLED DISCOVERY FOR NEXT HOP DETERMINATION

This application claims the benefit of U.S. Provisional Application entitled "TOPOLOGY CONTROLLED DISCOVERY FOR NEXT HOP DETERMINATION", No. 60/956,077, filed Aug. 15, 2007. The entire contents of this provisional application are hereby incorporated by reference.

BACKGROUND

An ad hoc computing network comprises computing nodes that form a network topology amongst themselves on an ad hoc basis. Unlike traditional networks whose network topologies are planned, provisioned, or configured, ad hoc networks typically must rely on self-configuring abilities of their respective nodes to discover neighbors and form network topologies. Furthermore, because a node in an ad hoc network is allowed to autonomously alter its link relationships with other nodes, for example, by moving about, a network topology previously formed can undergo changes from time to time in a seemingly random manner.

Techniques to form topologies include exchanging, among nodes in an ad hoc network, radio signals that encode messages. For example, a node may transmit a request message to solicit response messages from its neighbors. To ensure a response, the node may transmit the request message at a sufficiently high transmission power level. Assuming one or more nodes receive the request message, some of the one or more nodes may need additional information from their neighbors and thus may broadcast their own requests. To ensure responses from their neighbors, those receiving nodes that broadcast their own request may have to do so at sufficiently high transmission power levels themselves.

Since nodes in an ad hoc network typically are mobile devices that carry limited-size batteries as their energy sources, these existing techniques have a serious disadvantage of draining precious battery powers of nodes, if the nodes are frequently involved in broadcasting requests and replying to requests, as would be expected in a relatively mobile ad hoc network.

Thus, an improved way of broadcasting requests in an ad hoc network is needed.

SUMMARY

In accordance with an embodiment of the present invention, an intelligent broadcast logic is implemented by a particular node to determine an appropriate transmission power level for broadcasting its requests to neighbor nodes. In one embodiment, the requests are topology discovery request messages such as Ad-hoc On-demand Distance Vector (AODV) route requests. In one embodiment, when the particular node needs to discover its neighbor nodes for the purpose of establishing paths to various nodes in the ad hoc network, the particular node broadcasts a request for response at a particular transmission power level. Generally speaking, how many neighbor nodes can hear the request is determined by the request's signal intensity as determined by the particular transmission power level. A higher transmission power level generally leads to a higher number of other nodes that can hear the request. In turn, a higher number of other nodes that can hear the request lead to a higher number of other nodes that actually respond to the request. Finally, a higher number of other nodes that actually respond to the request lead to a higher number of neighbor nodes whose responses are actually received by the particular node. As used herein, the term "a neighbor node" refers to a node that may be used by the particular node as a next hop for one or more routing paths.

Suppose that the particular node receives a number of responses, say N responses. The responses received would indicate that at least N other nodes have received and responded to the request.

The particular node next determines whether N is within a desired range. As used herein, the term "a desired range" refers to a range of numbers within which the particular node in an ad hoc network would like to have its number of neighbor nodes to fall. For example, the desired range may be a range of 2 to 4 neighbor nodes.

In one particular embodiment, desired ranges may be the same for all nodes in the ad hoc network. In other embodiments, desired ranges may be different among nodes in the ad hoc network.

In one embodiment, the desired range of responsive nodes for a requesting node such as the particular node is predetermined. The particular node may, for example, provide an interface for a user to provide input to indicate what the desired range should be and store the desired range indicated in a data storage device accessible to the particular node. In other embodiments, the desired range may be programmatically determined by the particular node.

Furthermore, in some embodiments, while the particular node is in operation, the desired range for the particular node may change from time to time.

In one embodiment, the desired range may be programmatically changed by the particular node based on history information that the particular node keeps. In one embodiment, the history information comprises data correlating a number of neighbor nodes at a given time with a transmission power level that is used at a given time by the particular node. For example, based on the history information, the particular node may determine that at a particular transmission power level, the number of neighbor nodes comes within a particular range. This history information may be used by the particular node to establish appropriate values for the desired range.

In one embodiment, if the history information indicates a first transmission power level corresponds to a first N that is lower than the desired range, and if the history information indicates a second transmission power level, which is one level higher than the first transmission power level, corresponds to a second N that is higher than the desired range, the particular node may programmatically expand the desired range to cover either the first N, or the second N, or both first and second N's. As used herein, transmitting signals at the first transmission power level and the second transmission power level may occur in any temporal order.

In response to a determination that N is within the desired range, the particular node may conclude that the particular transmission power level is an appropriate power level to use for future transmissions.

On the other hand, in response to a determination that N is not within the desired range, the particular node may determine whether to adjust the particular transmission power level to a new transmission power level. In the present example of a desired range being 2 to 4 neighbor nodes, an out-of-range number for N, for example, may be zero, i.e., no response from a neighbor node has been received. Under this circumstance, the particular node may increase its transmission power level to a new, higher transmission power level, if possible. On the other hand, if the out-of-range number for N, for example, is 10; the particular node may decrease its transmission power level to a new, lower transmission power level, if possible.

In one embodiment, there are at least two transmission power levels that may be used by the particular node to broadcast its requests. The adjustments of transmission power levels previously mentioned may be done monotonically in one embodiment. The adjustment may also be done proportional to the difference between N and the desired range in one embodiment. These and other variations of adjusting power transmission level to a different level in a transmission power level hierarchy are within the scope of the present invention.

In one embodiment, if N is not within the desired range, the particular node may send a new topology discovery request message (e.g., with a new sequence identifier). In other words, this process as described may be repeated until (a new) N is within the desired range. When N is within the desired range, the particular node has a number of neighbor nodes that comes within the desired range.

In one embodiment, routing paths may be established as the number of neighbor nodes is being adjusted by varying transmission power levels. In another embodiment, routing paths may be established after the number of neighbor nodes comes within the desired range. In yet another embodiment, some routing paths may be established as the number of neighbor nodes is being adjusted by varying transmission power level, while the other routing paths may be established as the number of neighbor nodes comes within the desired range.

In one embodiment, one or more routing paths may be established by examining the contents of the responses received from the neighbor nodes. Relative to the one or more routing paths established, the N number of neighbor nodes represents a set of next-hop nodes to which the particular node may forward packets. In particular, a neighbor node which sends a response containing a set of routing paths may be used as a next-hop node (relative to the set of routing paths) to which the particular node may forward packets.

As one of nodes operating in the ad hoc network, the particular node may receive a packet that is to be forwarded to a node in the ad hoc network, say a destination node. Based on the one or more routing paths previously established, the particular node may determine one or more possible paths to the destination node. Specifically, each of the one or more possible paths has one of the N neighbor nodes as a next hop. The particular node may select a desired path from the one or more possible paths.

In some embodiments, the particular node may identify, based on the N number of responses received, an M number of nodes reachable from the particular node. The particular node next determines whether the M number of nodes includes the destination node. In response to a determination that the M number of nodes does not include the destination node, the particular node may programmatically determine new different values for the desired range. The process of sending request and responses may be repeated until a new N is within the desired range with the new values determined.

By carrying out the above methodology, the particular node obtains a desirable number of neighbor nodes without transmitting unnecessarily high intensity signals. Accordingly, power consumption by the nodes in the ad hoc network (each of which nodes may be the particular node as described herein in its own right) is reduced.

DETAILED DESCRIPTION OF THE EMBODIMENT(S)

System Overview

In accordance with one embodiment of the present invention, the methodology disclosed herein is implemented by a particular node (shown as node 1 of FIG. 1) in an ad hoc network. For purposes of the present invention, the particular node may be any node in the ad hoc network and may be any type of node. Examples of the particular node may include, but are not limited to, a mobile computing device that uses wireless (e.g., radio) signals in communication, or a stationary computing device in an ad hoc network that comprises nodes that may or my not be mobile. Other examples of the particular node may be a computing device that is stationary (e.g., a device installed on a train platform) with respect to one reference frame (e.g., the train platform) but mobile with respect to another reference frame (e.g., a passing-by train). To illustrate how such a particular node may operate in accordance with one embodiment of the present invention, reference will be made to the sample ad hoc network shown in FIG. 1.

Figure 1:
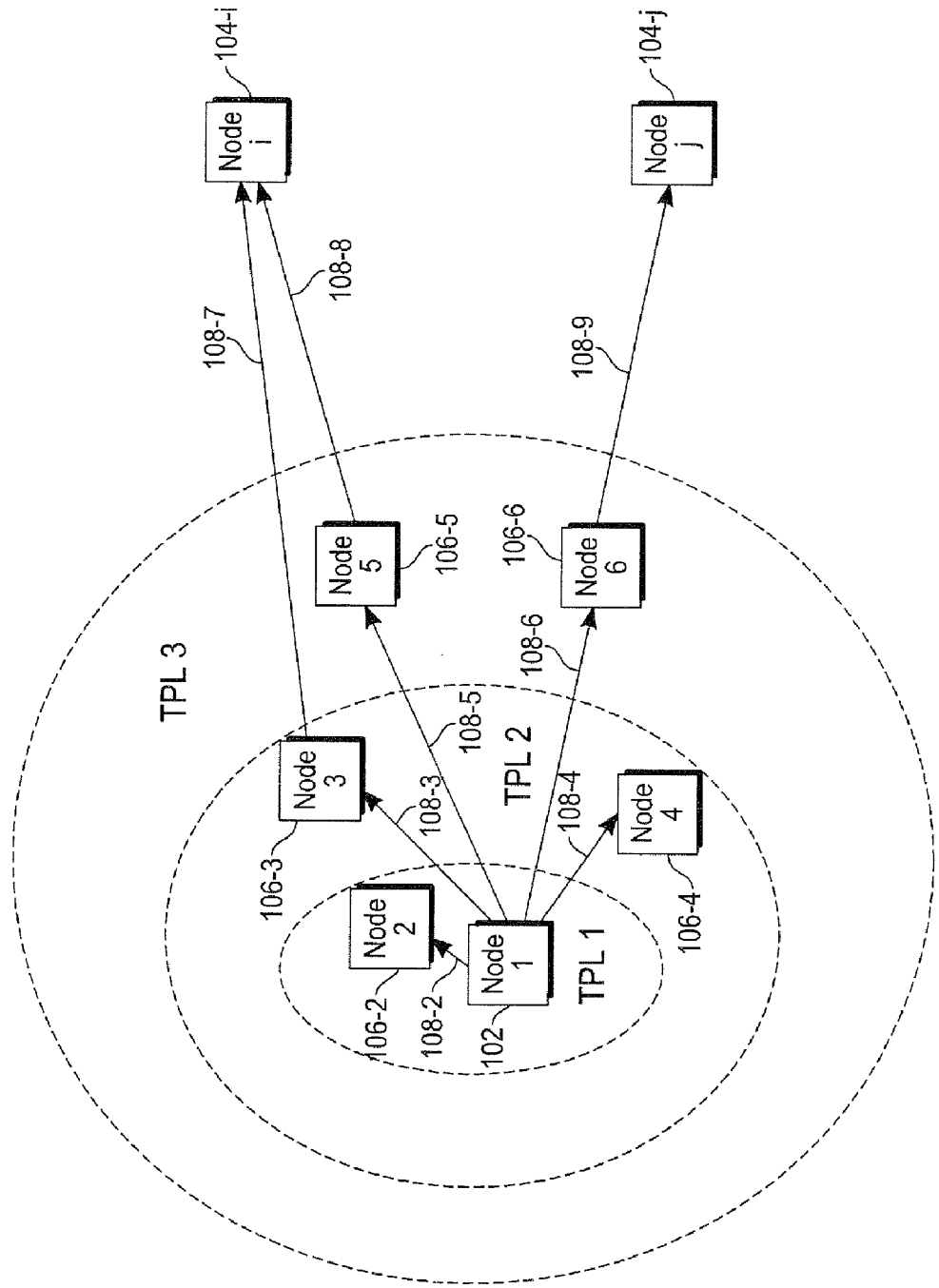
FIG. 1 shows a sample ad hoc network, in accordance with one embodiment of the present invention.

As shown in FIG. 1, the ad hoc network 100 comprises a particular node 102, two possible destination nodes 104-$i$ and 104-$j$ (nodes i and j of FIG. 1, respectively), and nodes 106-2 through 106-6 (nodes 2-7 of FIG. 1, respectively). The nodes 2-6 are nodes that may become neighbor nodes to the particular node 102 when the particular node broadcasts its request at various transmission power levels. The particular node 102 as a member of the ad hoc network 100 may receive (data) packets (from other nodes or some entities within the particular node 102). Some of these packets may specify the nodes i or j as destination nodes.

Transmission Power Levels

For illustration purposes, the particular node 102 has three different transmission power levels (TPL) (TPL 1 through 3 of FIG. 1). TPL 1 is the lowest transmission power level; TPL 2 is a higher transmission power level; and TPL 3 is a still higher transmission power level. Each TPL has its own signal coverage area as represented by one of three ovals in FIG. 1. In reality, the size and the shape of a signal coverage area is not necessarily regular as an oval, but may be affected by such environmental factors as topographic features of the site where the particular node and its surrounding nodes are located and by signal processing capabilities of the surrounding nodes. Generally speaking, the higher the transmission power level, the larger the signal coverage area. As illustrated, when the particular node 102 transmits its request at a transmission power level PTL 1, the particular node 102 only receives a response from the node 2. When the particular node 102 transmits its request at a higher transmission power level PTL 2, the particular node 102 receives responses from the nodes 3 and 4, in addition to the node 2. When the particular node 102 transmits its request at a still higher transmission power level PTL 3, the particular node 102 receives responses from the nodes 2 through 6.

Desired Range of Neighbor Nodes

In an embodiment, the particular node determines an appropriate transmission power level for broadcasting requests such that the number of responses received from neighbor nodes comes within a desired range. In one embodiment, the desired range may be between 2 and 4 neighbor nodes. In another embodiment, the desired range may be between 1 and 2 neighbor nodes. Still other ranges are possible in various embodiments of the present invention. In one particular embodiment, desired ranges may be the same for all nodes in the ad hoc network. For example, as shown in FIG. 1, the nodes 1 through 6, i, and j each may all have the same desired range for their respective numbers of neighbor nodes.

In other embodiments, desired ranges may be different among nodes in the ad hoc network. For example, a first node may be on a far edge of the ad hoc network and may only sporadically send data or receive data from other nodes. The desired range for the first node may be any number of neighbor nodes as long as the number is at least one neighbor node. On the other hand, for a second node that frequently receives and forwards data packets to other nodes, the desired range for the second node may be at least two neighbor nodes so that, even if all links or paths are broken through one of the two neighbor nodes, other links or paths going through the other of the two nodes may be used by the second node to send (e.g., forward) or receive packets.

In one embodiment, the desired range of neighbor nodes for the particular node is predetermined or preconfigured. For example, before the particular node is placed in service, or at the time when the particular node is booted, the desired range is set, prior to sending out any request for responses. In one embodiment, the particular node may provide an interface for a user to configure the desired range and store the desired range in a data storage device accessible to the particular node.

In some embodiments, even after the desired range is predetermined, the desired range may be later changed by the particular node. Thus, in these embodiments, the desired range for the particular node may change from time to time. In one embodiment, the desired range may be programmatically changed by the particular node based on history information kept by the particular node. In one embodiment, the history information correlates a number of neighbor nodes at a given time with a transmission power level that is used at a given time by the particular node. For example, the history information may be used to determine that at a particular transmission power level, the number of responsive nodes comes within a particular range. In one embodiment, the desired range may be programmatically determined as the particular range determined or some portion thereof.

In one embodiment, if the history information indicates a first transmission power level corresponds to a first N (where N is the number of responding neighbor nodes) that is lower than the desired range, and if the history information indicates a second transmission power level, which is one level higher than the first transmission power level, corresponds to a second N that is higher than the desired range, the particular node may programmatically expand the desired range to cover either the first N, or the second N, or both first and second N's. Conversely, if the history information indicates a first transmission power level corresponds to a first N that is higher than the desired range, and if the history information indicates a second transmission power level, which is one level lower than the first transmission power level, corresponds to a second N that is lower than the desired range, the particular node may programmatically expand the desired range to cover either the first N, or the second N, or both first and second N's.

Routing Paths

In one embodiment, one or more routing paths to various nodes such as the nodes i and j of FIG. 1 in the ad hoc network may be established as the number of neighbors is being adjusted by varying transmission power levels. In another embodiment, the one or more routing paths may be established after the number of neighbor nodes comes within the desired range. In yet another embodiment, some of the one or more routing paths may be established as the number of neighbor nodes is being adjusted by varying transmission power levels, while the other of the one or more routing paths may be established as the number of neighbor nodes comes within the desired range.

In one embodiment, the one or more routing paths to other nodes in the ad hoc network 100 may be established by examining the contents of the responses received from the responsive neighbor nodes. In one embodiment, the request that the particular node sends is a topology discovery request message such as an Ad-hoc On-demand Distance Vector (AODV) route requests. In this embodiment, responses, if any, from neighbor nodes of the particular node are AODV route replies that may contain information to establish the one or more routing paths to other nodes in the ad hoc network 100.

Relative to the one or more routing paths to other nodes in the ad hoc network 100, the N neighbor nodes represents a set of next-hop nodes to which the particular node may forward packets. For example, a neighbor node which sends a response (reply) containing a set of routing paths may be a next-hop node (relative to the set of routing paths) to which the particular node may forward packets.

Selecting a Desired Path to a Destination Node

In one embodiment, as a node operating in the ad hoc network, the particular node may receive a packet that is to be forwarded to a destination node in the ad hoc network, say node i or j. Based on the one or more routing paths established, the particular node, i.e., node 1, may determine one or more possible paths to the destination node. In one embodiment, each of the one or more possible paths has one of the N neighbor nodes as a next hop. The particular node may select a desired path from the one or more possible paths.

For example, suppose that the destination node for a packet to be forwarded by the particular node 102 is node i 104-i. Assuming that the particular node 102 acquires its neighbor nodes at a transmission power level PTL 3. Then, node 2 through 6 are neighbor nodes. Through these neighbor nodes, there are at least two possible routing paths as shown in FIG. 1 leading to the node i. The first path of the at least two possible routing paths comprises two links 108-3 and 108-7. The second path comprises two links 108-5 and 108-8. The particular node may select the first path as a desired path to the node i, while keeping the second path as a backup to be used when the first path breaks down. In some embodiments, the particular node may collect information on quality of service (QoS) data respecting all the possible routing paths and select the desired path by comparing quality of service (QoS) among all possible paths.

Determining a Desired Range Based on a Destination Node

Suppose that the particular node has a number of neighbor nodes that is within a desired range. In some embodiments, the desired range may still be programmatically changed depending on whether there is a routing path to a particular destination node with the current neighbor node configuration. In one embodiment, based on the N number of responses received, an M number of nodes reachable from the particular node may be determined. Based on the M number of nodes reachable from the particular node, the particular node may determine whether the M number of nodes provides at least one routing path to the destination node.

For example, referring to FIG. 1, the particular node may need to establish a routing path to a destination node such as the node j. If the particular node currently broadcasts its request for responses from neighbor nodes at the transmission power level PTL1, the particular node may only receive a response from one node, i.e., the node 2, but not from other nodes. Suppose that the initial value for the desired range of neighbor nodes is 1 to 2 neighbor nodes. Then, as far as the number of neighbor nodes is concerned, the current transmission power level is adequate because one neighbor node comes within the desired range. However, the desired range may still be changed because the current neighbor node configuration does not provide a routing path to the destination node, node j.

Thus, in response to a determination that the current number of neighbor nodes does not provide a routing path the destination node, the desired range may be changed from the current values to new different values. As a result, the process of locating a desirable number of neighbor nodes may be repeated for the new different values. In the present example, the next values, which the particular node may change the desired range to, may be 2 to 4 neighbor nodes.

To acquire the desired number of neighbor nodes, the particular node may send a new request (with new sequence identifier in one embodiment) at a new transmission power level. This process is repeated until, for example, a routing path to node j is found with a particular set of neighbor nodes. In the present example, suppose that the particular node now transmits a new request at the transmission power level PTL 2. Assuming the desired range is presently changed to 2 to 4 neighbor nodes as previously indicated, then an acquisition of the nodes 2, 3 and 4 as neighbor nodes would satisfy the desired range requirement. However, since none of the nodes 2, 3 and 4 provides a routing path to the destination node, node j, the desired range would still have to be re-set.

This process continues until a routing path to the destination node is found to the destination node.

The ad hoc network here has been described as comprising a particular node, five potential neighbor nodes, and two possible destination nodes. It should be noted that this is for illustrative purposes only. For purposes of the present invention, other nodes and other combination of potential neighbor nodes or possible destination nodes can also appear in the ad hoc network. Furthermore, as stated before, any node in the ad hoc network may be the particular node that implements an embodiment of the present invention. Thus, all variations of nodes and number of nodes are within the scope of the present invention.

The transmission power levels here has been described as comprising three levels, TPL 1 through 3. It should be noted that this is for illustrative purposes only. Other numbers of transmission power levels can be used. Furthermore, differences in signal intensity between two neighboring transmission power levels may be constant in one embodiment. Thus, in that embodiment, the signal intensity for level n may be linearly proportional to n. In another embodiment, signal intensities may be exponentially scaled. Thus, in that embodiment, the signal intensity for level n may, for example, be proportional to a constant to the power of n. In yet another embodiment, signal intensities may vary in different manners in the transmission power level hierarchy. For purposes of the present invention, these and other variations of transmission power levels are within the scope of the present invention.

The discussion here has been described with occasional references to AODV. It should be noted that this is for illustrative purposes only. For purposes of the present invention, other protocols of forming an ad hoc network can be used. For example, Dynamic Source Routing (DSR) may be used in forming the ad hoc network without loss of generality of the present invention. Thus, use of various ad hoc network protocols in conjunction with the present invention is within the scope of the present invention.

Sample Operation

Figure 2:
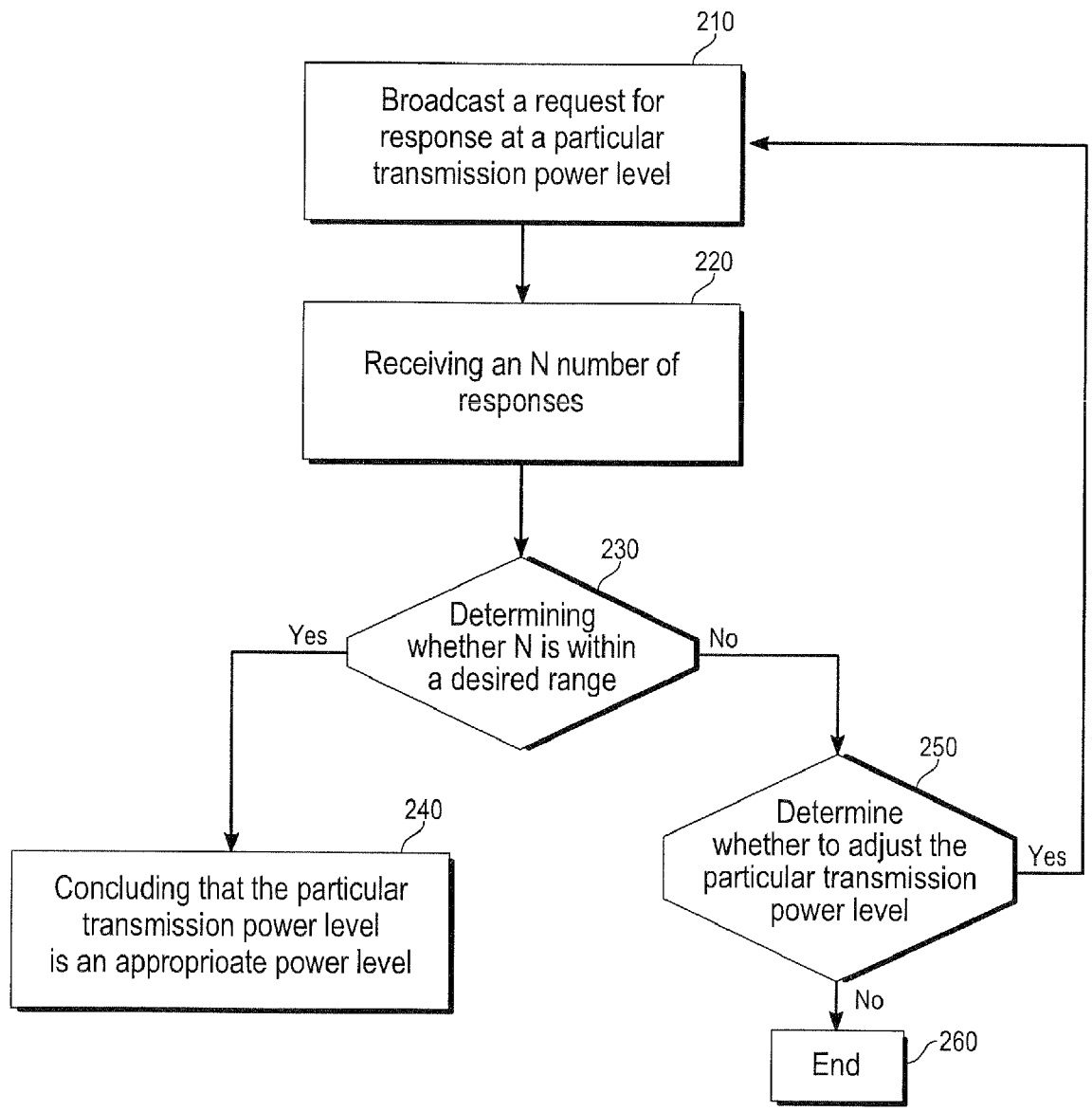
FIG. 2 is a high level flow diagram of one embodiment of the methodology of the present invention.

With reference to FIG. 2, after a desired range, say 2 to 4 neighbor nodes, is configured for the particular node to acquire, the particular node 102 broadcasts a request for response at a particular transmission power level, say TPL 1 of FIG. 1, at step 210 of FIG. 2. In one embodiment, the particular node starts from the lowest level in the transmission power level hierarchy.

At step 220, the particular node 102 receives a number of responses, say N responses. The responses received would indicate that at least N neighbor nodes 106 have received and responded to the request. As illustrated in FIG. 1, at the current transmission power level, i.e., TPL 1, the particular node 102 would receive only one response from node 2 106-2.

Next at step 230, the particular node determines whether N is within a desired range. In the present example, since the desired range specifies a number of neighbor nodes from 2 to 4, and since N is one, the number of nodes acquired does not come within the desired range.

In response to a determination that N is within the desired range, the particular node may conclude that the particular transmission power level is an appropriate power level to use for future transmissions at step 240 of FIG. 2. On the other hand, in response to a determination that N is not within the desired range, the particular node may determine whether to adjust the particular transmission power level to a new transmission power level at step 250 of FIG. 2. In the present example, since the number of nodes is smaller than the lower bound of the desired range, i.e., 2, the particular node may attempt to increase its transmission power level to a new, higher transmission power level. In some embodiments, adjustments of transmission power level may b controlled by software application programming interfaces (API) at the application level implemented by the particular node. On the other hand, if the out-of-range number for N, for example, is a 10, the particular node may attempt to decrease its transmission power level to a new, lower transmission power level.

As noted, the adjustments of transmission power levels previously mentioned may be done gradually in one particular embodiment. That is, if the transmission power level is to be decreased, the transmission power level is decreased to one level down if possible; correspondingly, if the transmission power level is to be increased, the transmission power level is increased to the next level up if possible. Other known methods of traversing a hierarchy in the art may also be used to adjust to a new different transmission power level. For example, the amount of adjustment in the signal intensity may be done proportional to the difference between N and the desired range in another embodiment. These and other variations of adjusting power transmission level to a higher or lower level are within the scope of the present invention.

In any event, if N is not within the desired range, the particular node 102 may adjust the transmission power level in one embodiment. In such an embodiment, the particular node may send a new topology discovery request message (e.g., with a new sequence identifier). This process as described above may be repeated until (a new) N is within the desired range. When N is within the desired range, the particular node has acquired a desirable number of neighbor nodes.

In some embodiments, even though N is not within the desired range, the particular node 102 may determine not to adjust the particular transmission power level, as indicated by step 260 of FIG. 2. For example, the particular node 102 may determine whether N is below the desired range and whether the particular transmission power level is the highest of available transmission power levels. In response to a determination that N is below the desired range and that the particular transmission power level is the highest of available transmission level, the particular node 102 may leave the particular transmission power level unchanged. Similarly, the particular node 102 may determine whether N is above the desired range and whether the particular transmission power level is the lowest of available transmission power levels. In response to a determination that N is above the desired range and that the particular transmission power level is the lowest of available transmission level, the particular node 102 may leave the particular transmission power level unchanged.

Hardware Overview

Figure 3:
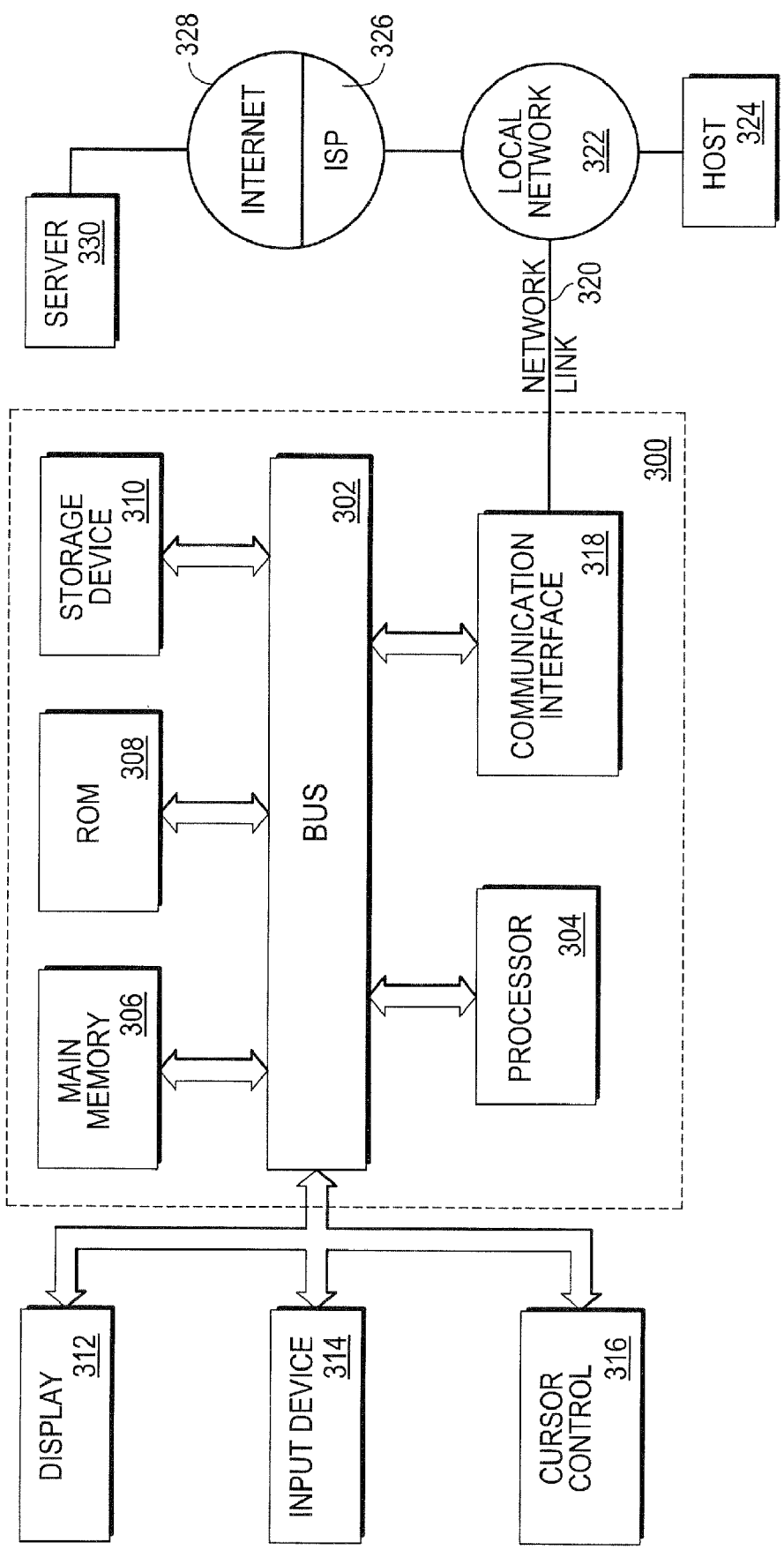
FIG. 3 is a block diagram of a general purpose computer system in which one embodiment of the present invention may be implemented.

In one embodiment, the logic and operation described herein takes the form of a set of instructions that are executed by one or more processors. FIG. 3 is a block diagram of a computer system 300 upon which an embodiment of the logic and operation described herein may be executed. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may further be a network connection that connects one or more of the components. Any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by a particular node in an ad hoc network, comprising:
    (a) broadcasting a request for response at a particular transmission power level;
    (b) receiving an N number of responses, thereby indicating that an N number of neighbor nodes received and responded to the request, wherein N represents a set of potential next-hop nodes to which the particular node may forward packets;
    (c) determining whether N is within a desired range;
    (d) in response to a determination that N is not within the desired range, adjusting the particular transmission power level and repeating (a) through (c);
    (e) in response to a determination that N is within the desired range, concluding that the particular transmission power level is an appropriate power level to use for future transmissions;
    (f) identifying, based on the N number of responses received, an M number of nodes reachable from the particular node;
    (g) determining whether the M number of nodes includes a destination node;
    (h) in response to a determination that the M number of nodes does not include a destination node, generating new values for the desired range and repeating (a) through (c); and
    (i) in response to a determination that the M number of nodes includes the destination node, transmitting a packet addressed to the destination node to a next-hop node using the particular power transmission level.

2. The method of claim 1, wherein adjusting the particular transmission power level comprises:
    determining whether N is below the desired range; and
    in response to a determination that N is below the desired range, increasing the particular transmission power level.

3. The method of claim 2, wherein adjusting the particular transmission power level further comprises:
    in response to a determination that N is above the desired range, decreasing the particular transmission power level.

4. The method of claim 1, wherein transmitting the packet addressed to the destination node to the next-hop node further comprises:
    receiving the packet addressed to the destination node;
    determining one or more possible paths to the destination node; and
    selecting, from the one or more possible paths, a desired path which uses the next-hop node.

5. The method of claim 1, wherein adjusting the particular transmission power level comprises:
    determining whether N is below the desired range;
    determining whether the particular transmission power level is highest of available transmission power levels; and
    in response to a determination that N is below the desired range and that the particular transmission power level is the highest of available transmission level, leaving the particular transmission power level unchanged.

6. The method of claim 1, wherein adjusting the particular transmission power level comprises:
    determining whether N is above the desired range;
    determining whether the particular transmission power level is lowest of available transmission power levels; and
    in response to a determination that N is above the desired range and that the particular transmission power level is the lowest of available transmission level, leaving the particular transmission power level unchanged.

7. The method claim 1, wherein determining whether N is within the desired range comprises:
    receiving user input indicating a range of neighbor nodes; and
    setting the desired range to a range of neighbor nodes indicated by the user input.

8. The method of claim 1, wherein determining whether N is within the desired range comprises programmatically setting the desired range.

9. A non-transitory machine readable medium, comprising instructions for:

(a) broadcasting, by a node comprising a computer system, a request for response at a particular transmission power level;

(b) receiving an N number of responses, thereby indicating that an N number of neighbor nodes received and responded to the request, wherein N represents a set of potential next-hop nodes to which the particular node may forward packets;

(c) determining whether N is within a desired range;

(d) in response to a determination that N is not within the desired range, adjusting the particular transmission power level and repeating (a) through (c);

(e) in response to a determination that N is within the desired range, concluding that the particular transmission power level is an appropriate power level to use for future transmissions;

(f) identifying, based on the N number of responses received, an M number of nodes reachable from the particular node;

(g) determining whether the M number of nodes includes a destination node;

(h) in response to determination that the M number of nodes does not include a destination node, generating new values for the desired range and repeating (a) through (c); and (i) in response to a determination that the M number of nodes includes the destination node, transmitting a packet addressed to the destination node to a next-hop node using the particular power transmission level.

10. The non-transitory machine readable medium of claim 9, wherein adjusting the particular transmission power level comprises:

determining whether N is below the desired range; and increasing the particular transmission power level in response to a determination that N is below the desired range.

11. The non-transitory machine readable medium of claim 9, wherein adjusting the particular transmission power level further comprises:

decreasing the particular transmission power level in response to a determination that N is above the desired range.

12. The non-transitory machine readable medium of claim 9, wherein transmitting the packet addressed to the destination node to the next-hop node further comprises:

receiving the packet addressed to the destination node;

determining one or more possible paths to the destination node; and selecting, from the one or more possible paths, a desired path which uses the next-hop node.

13. The non-transitory machine readable medium of claim 9, wherein adjusting the particular transmission power level comprises:

determining whether N is below the desired range;

determining whether the particular transmission power level is highest of available transmission power levels; and leaving the particular transmission power level unchanged in response to a determination that N is below the desired range and that the particular transmission power level is the highest of available transmission level.

14. The non-transitory machine readable medium of claim 9, wherein adjusting the particular transmission power level comprises:

determining whether N is above the desired range;

determining whether the particular transmission power level is lowest of available transmission power levels; and leaving the particular transmission power level unchanged in response to a determination that N is above the desired range and that the particular transmission power level is the highest of available transmission level.

15. The non-transitory machine readable medium of claim 9, wherein determining whether N is within the desired range comprises:

receiving user input indicating a range of neighbor nodes; and setting the desired range to the range of neighbor nodes indicated by the user input.

16. The non-transitory machine readable medium of claim 9, wherein determining whether N is within the desired range comprises programmatically setting the desired range.

* * * * *